UNITED STATES PATENT OFFICE.

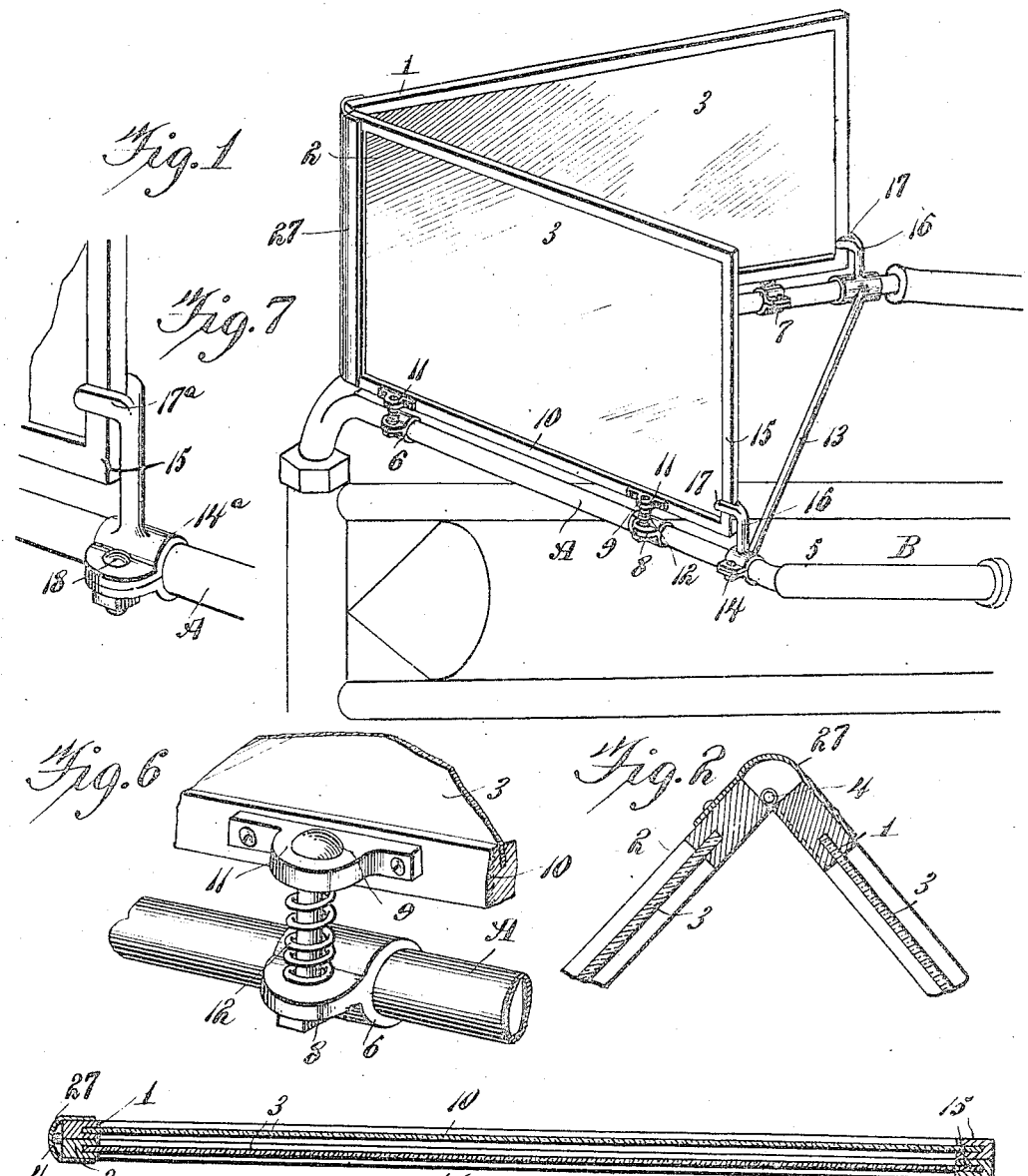

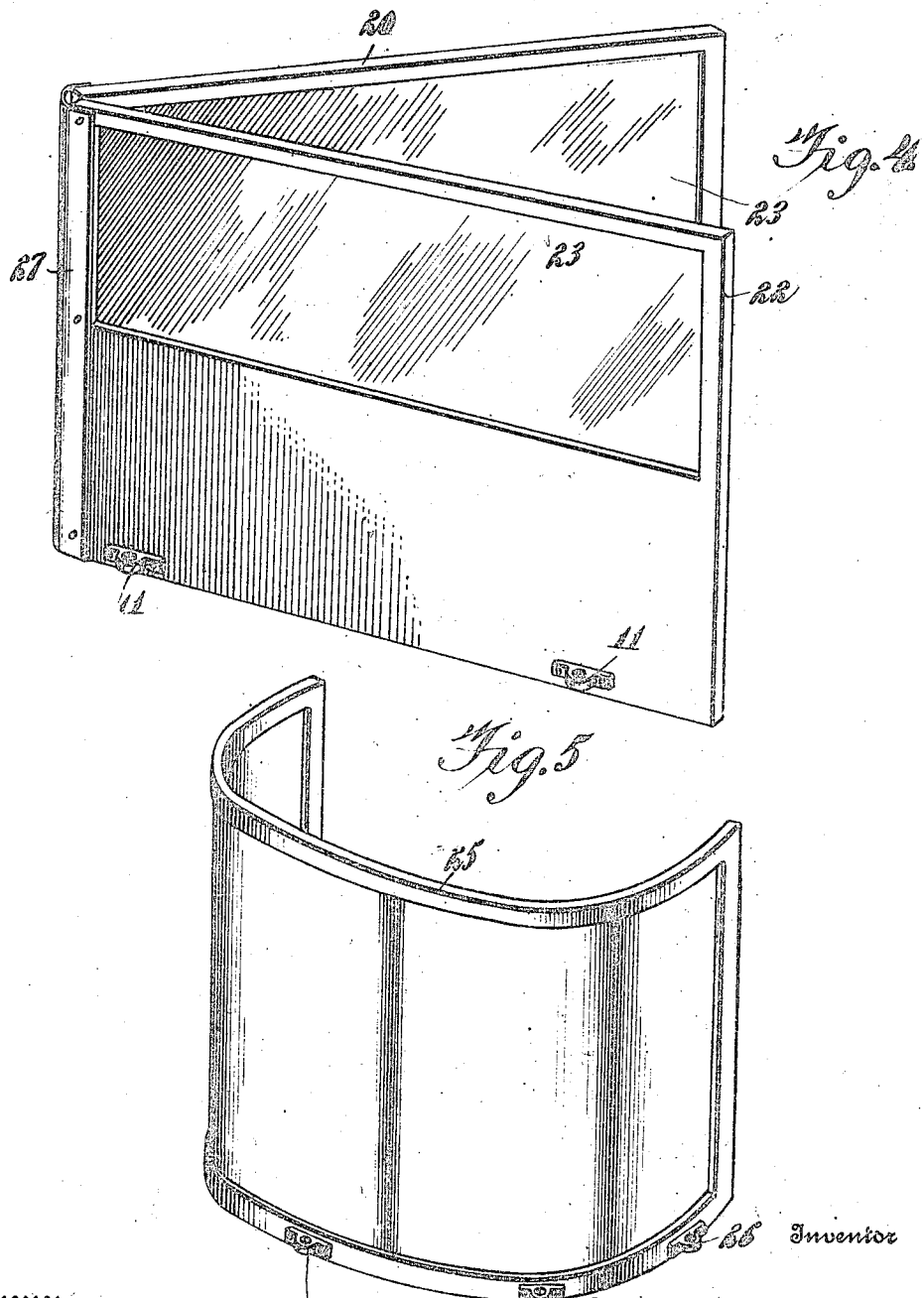

CHAUNCEY M. WRIGHT, OF PHILADELPHIA, PENNSYLVANIA.

WIND-SHIELD FOR VEHICLES.

1,042,305.   Specification of Letters Patent.   Patented Oct. 22, 1912.

Application filed April 16, 1912. Serial No. 691,097.

*To all whom it may concern:*

Be it known that I, CHAUNCEY M. WRIGHT, a citizen of the United States, residing at Philadelphia, in the county of Philadelphia and State of Pennsylvania, have invented new and useful Improvements in Wind-Shields for Vehicles, of which the following is a specification.

This invention relates to wind shields for vehicles and particularly to one designed for use upon motor-cycles or the like, an object of the invention being to provide a wind shield which will be so constructed as to offer little resistance to the travel of the machine and it will be provided with means whereby it can be readily attached to the handle bars and positioned directly in front of the body and face of the rider.

In the drawing forming a portion of this application, and in which like letters of reference indicate similar parts in the several views:—Figure 1 is a perspective view of a portion of a motor-cycle showing the application of the wind shield to the handle bars thereof. Fig. 2 is a horizontal section thru gu the shield. Fig. 3 is a view similar to Fig. 2 showing the shield folded. Fig. 4 is a view similar to Fig. 1 showing a slightly modified form of the invention. Fig. 5 is another view similar to Fig. 1 showing a still further modified form of the invention. Fig. 6 is a perspective view of one of the shield clamping and supporting members. Fig. 7 is a perspective view showing a slightly modified form of brace.

As shown in Fig. 1 the wind shield is constructed of companion frames 1 and 2 of identical formation, each being preferably rectangular and provided with transparent panels 3 such as celluloid, the latter being preferable on account of its flexibility and extreme toughness but it is obviously apparent that glass may be substituted therefor if desired. The frames are connected together by rule hinges or like joints 4 whereby the frames can be adjusted relatively to conform with the configuration of handle bars. The handle bars A of the motor-cycle conventionally shown at B in the drawings are substantially of V-configuration, the opposite arms thereof being disposed in parallel relation and having connected therewith the usual elastic hand grips 5. The frames 1 and 2 are disposed vertically upon the handle bars and immediately above the side arms thereof, the grips 5 of the handle bars being extended beyond the inner vertical surfaces of the frames as shown. Clamps 6 are removably secured to the side arms of the handle bars and as shown the members 7 of these clamps are provided with lateral lugs 8 through which bolts 9 extend. The lower bars 10 of the frames 1 and 2 are provided with integral lugs 11 through which the upper ends of the bolts 9 pass. Relatively strong springs 12 embrace the bolts 9 and are interposed between the lugs 11 and the clamps. Under the office of these springs the frames are adapted to yield vertically without affecting or disturbing the transparent panels 3 thereof. With a view to holding the frames against lateral strain I provide a horizontal brace bar 13 whose opposite ends are clamped as at 14 to the side arms of the handle bars at points preferably in advance of the outer ends of the hand grips 5. The vertical bars 15 of the frames 1 and 2 are disposed immediately adjacent the vertical posts 16 of the bar 13, and as illustrated the said bars 15 are embraced by the arms 17 at the upper terminals of the posts. This construction is such that the frames 1 and 2 are free to yield vertically as described while the frames are effectually held against lateral strain and positively prevented from pulling away from the clamps 7.

If desired clamps 14ª may be secured to the side arms of the handle bars by set screws or the like 18 as shown in Fig. 7. These arms are provided with the bifurcated portions 17ª whose side arms are embraced by the inner vertical bars of the frames. In this modification the connection bar 13 previously described is eliminated.

In the modified form shown in Fig. 4 the frames 20 and 21 are provided with upper transparent portions 22 and lower translucent portions 23. The frames are provided with clamps 24 which are identical in construction with the clamps shown in the preferred embodiment of the invention.

In the modified form of the invention shown in Fig. 5 a single frame 25 is employed, the same being attached to the handle bars by clamps 26. The frame 2 is provided with a wind guard 27 which is curved forwardly and which fully extends across the joint between the companion sections 1 and 2.

I claim:—

1. A wind shield comprising a shield member, in combination with the handle bars of a vehicle, clamps secured to the handle bars, bolts carried by the clamps, portions on the shield member slidably receiving the bolts, and springs interposed between said portions and the clamps.

2. A wind shield for bicycles comprising foldable frames, and means for securing the frames to the handle bars, and a shield carried by one of the frames and extending across the joint between the frames.

In testimony whereof I affix my signature in presence of two witnesses.

CHAUNCEY M. WRIGHT.

Witnesses:
HELEN G. DALEY,
NORMAN J. SMITH.